No. 657,989. Patented Sept. 18, 1900.
P. J. MADDEN.
WATER CLOSET.
(Application filed Mar. 1, 1895.)
(No Model.) 2 Sheets—Sheet 1.
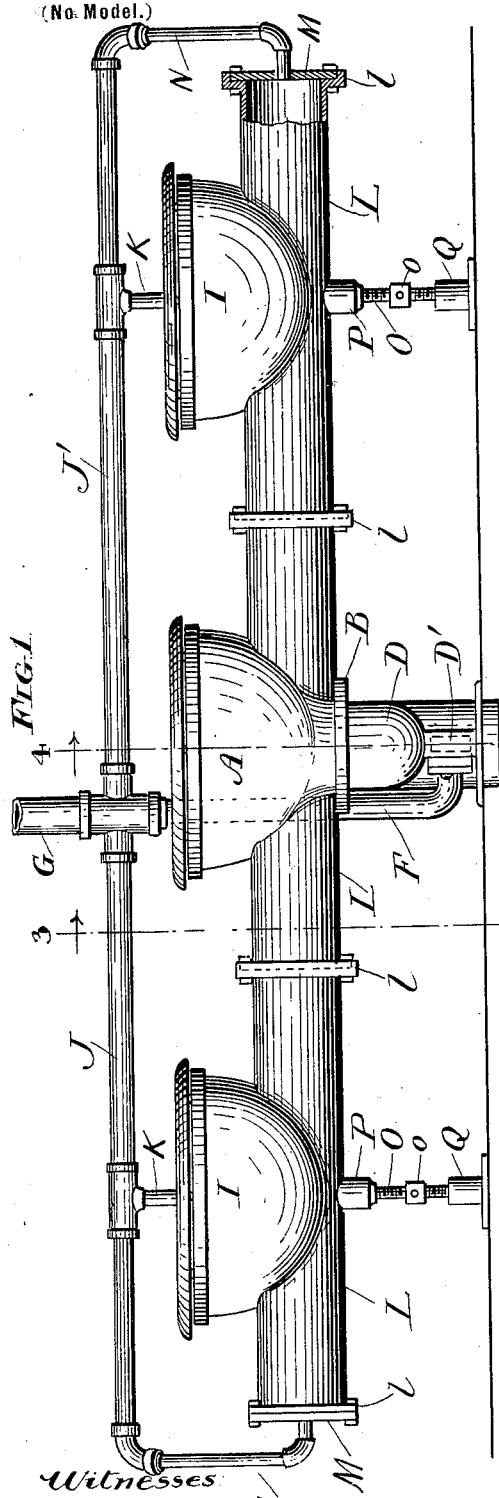
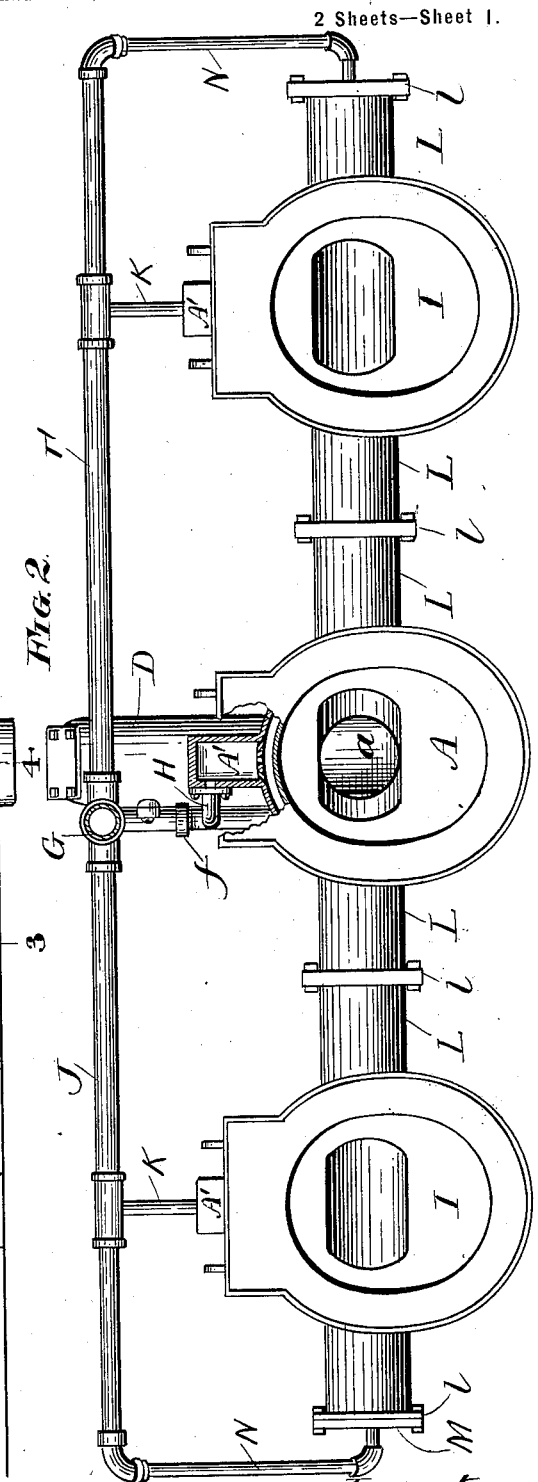
Witnesses
J. Halpenny
Gust Dinse
Inventor:
Patrick J. Madden
By his attorneys
Gidley & Hopkins
THE NORRIS PETERS CO., PHOTO-LITHO., WASHINGTON, D. C.

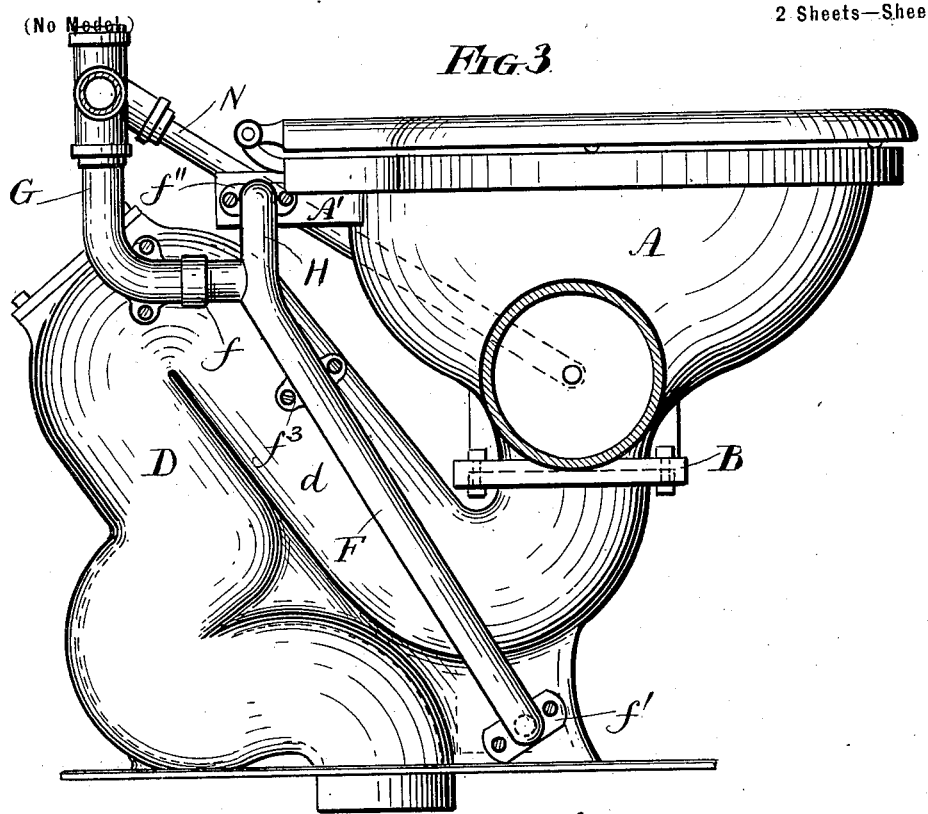
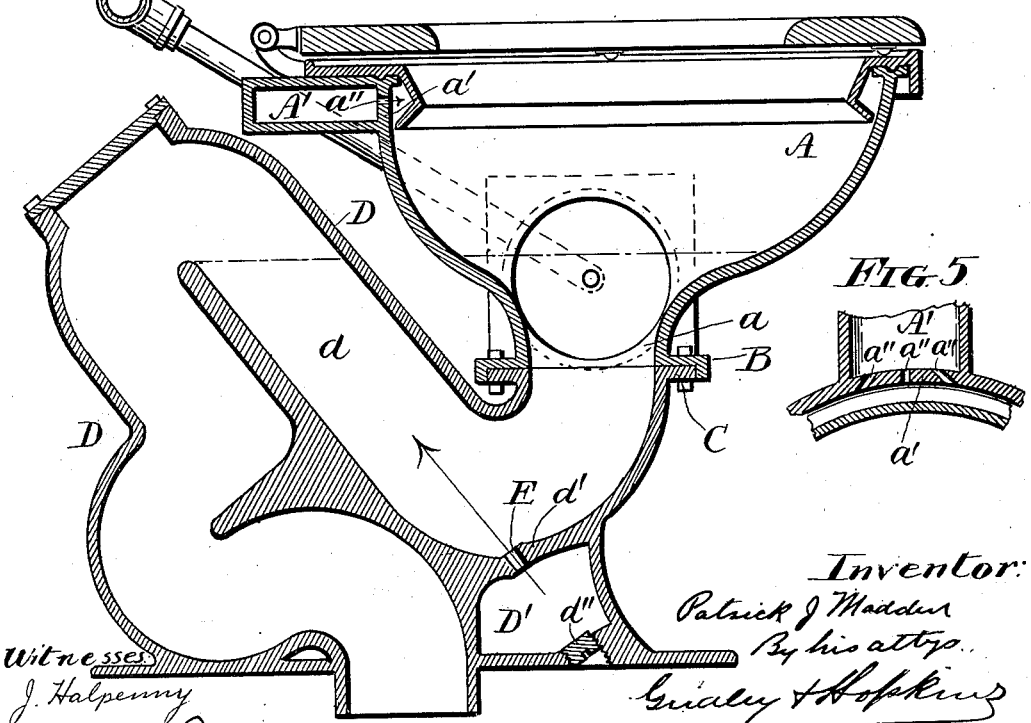

United States Patent Office.

PATRICK J. MADDEN, OF CHICAGO, ILLINOIS

WATER-CLOSET.

SPECIFICATION forming part of Letters Patent No. 657,989, dated September 18, 1900.

Application filed March 1, 1895. Serial No. 540,162. (No model.)

*To all whom it may concern:*

Be it known that I, PATRICK J. MADDEN, a citizen of the United States, residing at Chicago, in the county of Cook and State of Illinois, have invented certain new and useful Improvements in Water-Closets, of which the following is a specification.

For the purposes of this application I have shown the several features of the invention embodied in what is known in the art as a "range-closet," or, in other words, a closet in which there is a range or series of bowls and mechanism for simultaneously flushing all of them, and while there are some features of the invention that are applicable only to a closet of this class, still I desire to have it understood that there are other features that are applicable to a closet having only a single bowl or a number of bowls having separate flushing devices.

The invention consists in the features of novelty that are particularly pointed out in claims hereinafter, and in order that it may be fully understood I will describe it with reference to the accompanying drawings, which are made a part of this specification, and in which—

Figure 1 is a front elevation of a water-closet embodying the invention. Fig. 2 is a plan view thereof with the seats omitted. Figs. 3 and 4 are vertical sections thereof on the lines 3 3 and 4 4, respectively, Figs. 1 and 2. Fig. 5 is a detail view.

I will first describe those features of the invention that are applicable to water-closets generally without regard to the number of bowls used, as all of said features are shown in the drawings as being embodied in the central bowl A of the range-closet. This bowl has at bottom a flange B, which surrounds its discharge-opening $a$ and is secured by bolts to a flange C on the trap D. This trap is of the siphon variety, and a jet-opening E is arranged to throw a jet of water upward into its short limb $d$. The jet-opening is supplied with water from a chamber D′, located in the base of the trap, and this chamber is supplied with water through a pipe F, having a socketed branch $f$ for receiving the supply-pipe G and a second branch H, that communicates with a chamber A′, located at the back of the bowl. Ordinarily in cast-iron closets the jet-opening is the result of intersecting holes bored or cored in the base of the trap, and consequently it takes the form of a bent passage of the same diameter from end to end, one end of which opens into the bottom of the short limb of the siphon, while the other end opens at the side of the base and communicates with the pipe that supplies it; but according to the present invention I provide the base of the cast-iron trap with the chamber D′, the cross-sectional area of which is much larger than that of the jet-opening proper, and I form the jet-opening through the top $d'$ of said chamber by boring. In order to do this, an opening is made in the bottom of the chamber and this opening is afterward closed by a plug $d''$. This chamber is a decided advantage, as it enables the jet-opening to be located with exactness, and it also reduces to a minimum the amount of boring that is necessary to form it. Furthermore, it has an advantage that manifests itself in the operation of the device. Where the opening consists simply of a bent passage of uniform diameter, the direction that the water takes upon leaving it depends to a greater or less extent upon the bends and contortions of the passage itself, but with this chamber of greater cross-sectional area than the jet-opening the water has a chance to subside before entering the jet-opening, and from said opening it will be delivered in a solid jet, the course of which will be true to the direction of the opening.

I am aware that it has been proposed to provide an earthenware closet with a chamber located in the base thereof and having through its top wall a jet-opening which directs a jet of water upward into the short leg of the siphon, and I do not claim, broadly, to be the inventor of such a chamber. So far as the present invention relates to this chamber it is confined exclusively to cast-iron closets, and its object is to provide for the practical and economical construction thereof.

The chamber A′ is intregal with the bowl and has in one of its sides an opening with which the branch H of the pipe communicates. The back part of the bowl forms the front wall $a'$ of the chamber, and through this wall are formed three openings $a''$, as shown more clearly in Fig. 5, two of which diverge and discharge jets of water into the hollow rim and toward the sides of the bowl, while the other discharges straight forward into said rim and supplies the back part of the bowl.

Ordinarily the branching pipe F $f$ H is made up of a number of separate sections united by threaded elbows, but according to the present invention it consists of a single casting having laterally-projecting ends and having at one end flanges $f'$ for the passage of screws by which that end is secured to the side of the chamber D' and at the other end flanges $f''$ by which it is secured to the side of the chamber A'. It has also, at an intermediate point, flanges $f^3$ by which it is secured to the leg $d$ of the trap, and in this way it is made to serve the purpose of a brace for sustaining the upper portion of the bowl.

All of the features thus far described may be used in a closet having only a single bowl or a number of bowls having independent flushing devices, and on the other hand they are not essential features of the present invention so far as it relates to a range-closet. I prefer, however, to use them on the central bowl.

I will now describe those features of the invention that are applicable only to a range-closet.

I I are bowls arranged upon both sides of the central bowl. As shown in the drawings, only one bowl is arranged upon each side of the central bowl, and while this is sufficient for the purpose of illustrating the several novel features of the improved closet still I desire to have it understood that my invention is not limited in this respect, and excepting where the contrary is expressly made to appear the term "range" as used in this specification means two or more.

From the common supply-pipe G branch pipes J J' extend in opposite directions to opposite ends of the range, and from these branches all of the bowls I are supplied through other branches K, that communicate with the chambers A', from which water for flushing the bowls is supplied to them.

A feature peculiar to range-closets is that all of the bowls empty into a horizontal pipe (called the "range-pipe") arranged beneath them, and this pipe discharges into the soil-pipe through a single trap. The range-pipe is preferably made up of a number of separate sections L, and each of the bowls is integral with one of these sections. It joins the sides of the bowl preferably at such height that the lower side of the pipe forms the bottom of the bowl and projects in opposite directions therefrom. The ends of the several sections are provided with flanges $l$, and the meeting flanges on the ends of adjacent sections are secured together by bolts. To the flanges at the outer extremities of the end section are bolted plates M, that close the ends of said sections, and through these plates are tapped pipes N, that form continuations of the branches J J'. These pipes N are of much smaller capacity than the range-pipe, and they are adapted to discharge jets of water thereinto.

The operation of this closet is as follows: At each flushing operation water enters the rims of all of the bowls, and jets of water are discharged into the range-pipe at its opposite ends and into the short leg of the siphon. The siphonic action of the trap itself aided by the action of the jet produces a powerful suction and exhausts the water from the central bowl, and thereby causes water to flow from opposite ends of the range-pipe toward and into the central bowl, the tendency of the water to take this course being very materially increased by the jets that are discharged into the opposite ends of the range-pipe.

I am aware that in a water-closet having a single bowl a jet has been discharged upward into the short leg of the siphonic trap; but I am not aware that a "jet" (technically so called) was ever discharged into the range-pipe of a range-closet prior to my invention. The effect of discharging this jet into the range-pipe is to produce a powerful flow of water through it, and unless the trap be efficient the bowl nearest it will be overflooded. Hence it is almost imperative that a jet be discharged into the trap where a jet is discharged into the range-pipe, and this is especially so where the range includes many bowls and the range-pipe discharges into a trap located beneath one of them.

I am aware that it has been proposed to discharge the water for flushing a range of bowls into the opposite ends of the range-pipe; but this is not the equivalent of the present invention, which contemplates introducing the flushing-water into the bowls themselves through openings located above the discharge-openings and at the same time introducing into the range-pipe a jet or jets. This term "jet" is used in this specification in a technical sense, and means a small stream of water introduced into and through a larger body of water for the purpose of introducing a current in the latter. Prior to my invention it was never proposed to introduce such a jet into the range-pipe of a range-closet.

The bowl A is spoken of in this specification as the "central" bowl, and while it is preferred to have it truly the central bowl still this is not essential, and hence I desire to have it understood that this term is to be construed liberally, so as to include any intermediate bowl of the range toward which the water flows from both ends of the range.

The wall between the two legs of the siphon is of such height that normally the entire range is filled with water to the level indicated by the dotted line in Fig. 4. The supports for the bowls I are made adjustable in order to relieve the range-pipe of strain that would come upon it if the floor were uneven and non-adjustable supports were used. These supports preferably consist of a screw O, having right and left threads, a boss P on the under side of the bowl having a threaded socket for receiving one end of the screw, and a base or foot Q, having a threaded socket for receiving the other end of the screw, the screw being provided at an intermediate point with a feature o for receiving an implement for turning it.

What I claim as new is—

1. In a water-closet, the combination with a bowl having an opening for the admission of water to its rim and a trap communicating with the bowl at bottom, whence it proceeds upward, and having a jet-opening, of an integral pipe having laterally-projecting ends and having at its lower end a flange bolted to the lower portion of the trap, at its upper end a flange bolted to the bowl, and at an intermediate point a flange bolted to an intermediate portion of the trap whereby the bowl and trap are braced against each other, the bowl and trap having passages through which the pipe communicates with the rim-opening and jet-opening, respectively, substantially as set forth.

2. In a water-closet, the combination of a range of bowls having discharge-openings, and rim-openings of sufficient capacity to admit a volume of water sufficient for flushing purposes, a range-pipe with which the discharge-openings of all the bowls communicate, a trap, means for supplying the rim-opening of each of the bowls with a sufficient quantity of water for flushing purposes, a jet-opening of very much smaller capacity than the range-pipe arranged to discharge a jet of water thereinto, and means for supplying said jet-opening with water, substantially as set forth.

3. In a water-closet, the combination of a range of bowls having discharge-openings and rim-openings of sufficient capacity to admit a volume of water sufficient for flushing purposes, a range-pipe with which the discharge-openings of all the bowls communicate, a trap, means for supplying the rim-openings of each of the bowls with a quantity of water sufficient for flushing purposes, means for discharging a jet of water into the trap, a jet-opening of very much smaller capacity than the range-pipe arranged to discharge a jet of water thereinto, and means for supplying the jet-opening with water, substantially as set forth.

4. In a water-closet the combination of a range of bowls having discharge-openings and rim-openings of sufficient capacity to admit a volume of water sufficient for flushing purposes, a range-pipe with which the discharge-openings of all the bowls communicate, means for supplying the rim-openings of all the bowls with a volume of water sufficient for flushing purposes, jet-openings of very much smaller capacity than the range-pipe arranged to discharge jets of water into the opposite ends thereof, means for supplying said jet-openings with water and a trap communicating with the discharge-opening of an intermediate bowl, substantially as set forth.

5. In a water-closet the combination of a range of bowls having discharge-openings and rim-openings of sufficient capacity to admit a volume of water sufficient for flushing purposes, a range-pipe with which the discharge-openings of all the bowls communicate, means for supplying the rim-openings of all the bowls with a volume of water sufficient for flushing purposes, jet-openings arranged to discharge jets of water into the opposite ends of the range-pipe, means for supplying said jet-openings with water, a trap communicating with the discharge-opening of an intermediate bowl of the range, a jet-opening arranged to discharge a jet of water into one leg of the trap, and means for supplying said jet-opening with water, substantially as set forth.

6. In a water-closet the combination of a range of bowls having discharge-openings and rim-openings of sufficient capacity to admit a volume of water sufficient for flushing purposes, a range-pipe with which the discharge-openings of all the bowls communicate, a trap communicating with the discharge-opening of an intermediate bowl of the range, a water-supply pipe common to all of said bowls having a branch communicating with the rim-opening of each bowl, and a branch extending to each end of the range-pipe, and jet-openings at each end of the range-pipe with which the branches last aforesaid communicate, substantially as set forth.

7. In a water-closet the combination with a range of bowls having discharge-openings and rim-openings of sufficient capacity to admit a volume of water sufficient for flushing purposes, a range-pipe with which the discharge-openings of all of the bowls communicate, a trap communicating with the discharge-opening of an intermediate bowl of the range, a jet-opening arranged opposite one leg of the trap, a water-supply pipe communicating with the rim-openings of all of the bowls and with the jet-opening of the trap, said pipe having branches extending to the ends of the range-pipe, and jet-openings with which the last-named branches communicate, said jet-openings being arranged to discharge jets of water into the range-pipe from opposite ends thereof, substantially as set forth.

P. J. MADDEN.

Witnesses:
S. O'HAIRE,
L. M. HOPKINS.